Patented Feb. 21, 1950

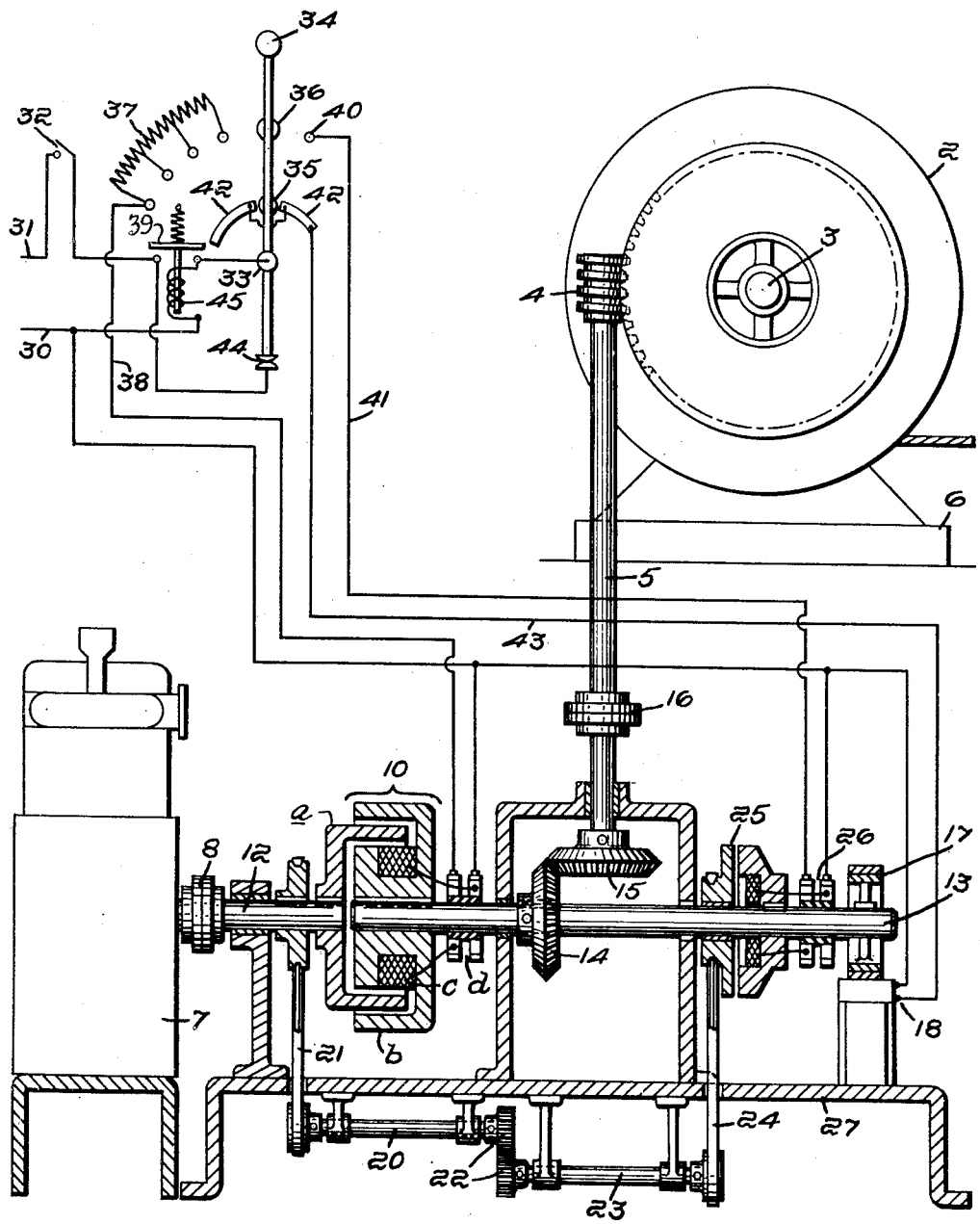

2,498,244

UNITED STATES PATENT OFFICE 2,498,244

WINCH DRIVING MECHANISM

Isadore Bromfield, Waban, Mass.

Application September 14, 1944, Serial No. 554,093

6 Claims. (Cl. 192—9)

1

This invention relates to winch driving mechanisms, and is more especially concerned with the operation of winches of the type used on a fishing boat to tow the trawl.

In fishing, the trawl is customarily towed until it is assumed to have collected a satisfactory quantity of fish. At the conclusion of that period the winch, to the drums of which the trawl cables are fastened, is operated to pull the trawl up to the boat where it is secured and then is unloaded. It has been found by experience that the best results are obtained if this pulling operation is performed at a fairly uniform speed, because any great slackening of that rate affords an opportunity for some of the fish to escape. Moreover, when this pulling-up operation has been substantially completed and the trawl is being fastened to the side of the boat, complete control of it then is very important.

While these operations ordinarily involve no great difficulty so long as conditions are favorable, the situation becomes quite different when they must be performed with a high sea running. Then, as the ship rises on a wave, a greatly increased strain is placed on the cables, thus tending to increase the upward rate of travel of the trawl, and when the ship settles down into the trough of the sea, the cables will be slackened rapidly again, with a consequent tendency to slow down the trawl. And these operations will be repeated with each wave. It is customary to drive the drums of the winch through friction clutches, and to slacken the tension on the cables by slipping the clutches. This requires constant attention on the part of an operator, since otherwise the strain on the cables may become so great as to stall the winch and slip the main clutch on the engine which operates it, or to break a cable or some part of the driving mechanism for the winch. Moreover, the frequent slipping of the clutches subjects their friction surfaces to rapid wear, creates a tremendous amount of heat and smoke, and makes it necessary to repair the winches at frequent intervals.

A common arrangement for driving these winches has been from an engine through a worm and worm wheel. While the irreversibility of this drive usually is a great advantage, there are times when it is highly objectionable, as for example when a man becomes caught in the winch ropes or cables, and it consequently is desirable to slacken them back as quickly as possible. The same desirability also arises in fastening the trawl to the side of the boat when high seas are running.

2

Another drive much used on fishing boats is known as the "electric drive," and consists of an electric generator driving an electric motor which, in turn, drives the winches through an automatic torque control. From an operating standpoint this organization has proved the most satisfactory of any of the prior art drives in common use, and it has the best record for fish production, other conditions being equal. It is, however, open to two important objections:

(1) It is very expensive in first cost and very complicated;

(2) It is subject to break-downs more or less serious, many of which are caused either directly or indirectly by the fact that the equipment is mounted on ship-board where it is subject to conditions definitely unfavorable to the operation of electrical equipment. Also, to keep a skilled electrical repair man continuously on board is considered too expensive a matter for a fishing vessel.

The present invention aims to devise a mechanical drive for winches which will closely approximate, in operation, the flexibility of control provided by the electrical drives, while avoiding their complications; will compare favorably in initial cost with the prior art mechanical drives; and which, in addition, will be reversible.

Much of the difficulty experienced with these prior art constructions also is due to misalignments of the units caused by poor installation or the warping, springing, or bending of parts of the ship relatively to each other in a heavy sea, and it is one of the objects of this invention to devise a construction in which this source of trouble will be substantially eliminated.

The manner in which it is proposed to accomplish these objects will be readily understood from the following description when read in connection with the accompanying drawings, and the novel features will be particularly pointed out in the appended claims.

The single figure of the drawings is a diagrammatic view illustrating a driving mechanism and a control system therefor, adapted more especially for the operation of winches of the type commonly used on a trawler.

In the construction shown, the winch is indicated at 2, and it may include, as usual, two drums on which the trawl cables are wound, respectively, both drums being mounted on the single shaft 3 and driven through independent clutches, which may be jaw clutches. The shaft has a worm wheel keyed to it, meshing with a worm 4 fast on the upper end of the shaft 5.

Preferably the driving mechanism for the winch is located below decks and includes a prime mover 7 connected through a flexible coupling 8 to a power transmitting unit comprising an electrically controlled eddy current coupling indicated, in general, at 10. It may be of a common form manufactured by several commercial concerns such, for example, as the Dynamatic Corporation of Kenosha, Wisconsin, and it consists essentially of a driving element $a$ fast on the power shaft 12 and a driven element $b$ fast on the driven shaft 13, both shafts being supported in alignment with each other for rotation around a common axis. Between the elements $a$ and $b$ is a winding $c$ to which current is supplied by slip rings $d$ from any suitable source of power. When current is fed to this winding, and the element $a$ of the coupling is revolved, the eddy currents so created will react on the driven member $b$ to revolve it at a slower speed than the part $a$ and its shaft 12, and this rotary motion will be transmitted to the driven shaft 13, the degree of torque so developed in the driven element depending upon the amount of energy delivered to the winding $c$. This rotative movement is transmitted to the shaft 5 through a power take-off bevelled gear 14, meshing with a companion gear 15 on a lower section of the shaft 5, the two sections being connected by a flexible coupling 16.

Also included in this mechanism is a brake 17 equipped with an electromagnet 18 which serves normally to hold the brake in its idle or "off" position, the braking pressure being applied by a spring or springs. Such brakes are readily obtainable commercially.

This invention further includes additional mechanism which may be brought into action, at will, to drive the worm shaft 5 and the winch drums in a reverse direction. As shown, it comprises a shaft 20 driven from the power shaft 12 by a pulley and belt connection 21 and operating through a pair of intermeshing spur gears 22 to drive another shaft 23 in the opposite direction. The latter shaft, in turn, is connected through a second pulley and belt mechanism 24 and a clutch 25 to the driven shaft 13. The clutch just mentioned also is electrically controlled and is spring-biased so that it is normally in its "out" or inactive condition. However, it includes an electromagnet to which current can be delivered through slip rings 26 and, when so energized, it transmits power supplied through the connections with the shaft 12, as just described, to revolve the shaft 13 in a direction opposite to its normal direction of rotation.

All of these power transmitting units, including the two shafts 12 and 13, the coupling 10, brake 17, clutch 25, and the bevel gears 14 and 15, are assembled on a rigid frame 27 where they are supported in accurate alignment with each other. Because this frame is rigid and the entire assembly forms a self-contained unit, there is practically no danger of the parts getting out of alignment due to flexing of the ship. Moreover this unit construction not only contributes to the reliability of operation of the mechanism and reduces the necessity for repairs, but it also reduces the initial cost and the expense of installation on the boat.

In this connection it may be pointed out that the motor, engine, or other prime mover 7 for operating the winch either may or may not be made a part of this assembly, as desired. Usually it is omitted because such omission is, in general, found to be more advantageous when installing the power transmission unit, particularly since circumstances may dictate the use of a belt drive to some motor provided for another purpose or from the engine that drives the propeller shaft.

The operation of such a unit requires a special control system. As shown, this system includes a main conductor 30 leading from one terminal of a source of supply to one of the slip rings $d$ of the coupling 10; also to one terminal of the brake solenoid 18 and to one of the clutch slip rings 26. The other main conductor 31 is led through both an emergency switch 32 and also through a relay switch 39, later to be referred to, to a connection point 33 on the control lever 34. From this point 33 current is conducted to contacts 35 and 36 on said lever. The latter of these contacts is designed to engage any one of a series of contacts on the rheostat 37 which is connected by the conductor 38 to the other slip ring $d$ of the electrically operated coupling 10. Also, when the lever is swung in the opposite direction, it will engage with a contact 40 which is connected by the conductor 41 with the other slip ring 26 of the electrically controlled clutch 25. Thus either the coupling or the clutch can be brought into action selectively but both cannot be made to operate at the same time.

The contact 35 is arranged to engage with either of two segments 42—42 which are electrically connected together and both of which are connected by a conductor 43 to the other terminal of the solenoid 18 for controlling the brake 17. Thus the controller holds the brake off when either the coupling 10 or the clutch 25 is in action.

Assuming that the trawler has completed a "set" and the pulling up operation is about to begin, the engine 7 is started up, the operator closes the switch 32, and current flows through the conductor 31 to the contact 44 (the controller 34 at this time being in its middle or neutral position), thence to the point 33, and through the relay coil 45 to the conductor 30. This closes the relay switch 39 and the operator next moves the controller 34 toward the left. At the time this movement is initiated, the winch shaft 3 is held stationary because the brake 17 is on, but as soon as the controller contact 35 engages the contact 42, the solenoid 18 becomes energized and releases the brake. At the same time the other controller contact 36 engages the nearest contact on the rheostat 37, thus allowing a relatively weak current to flow through the winding $c$ of the eddy current coupling 10. This initiates the transmission of power from the shaft 12 to the shaft 13 and the latter begins to revolve the winch drums slowly. They may be speeded up by swinging the controller lever 34 further to the left, which cuts out more resistance in the rheostat 37, increases the flow of current through the coil $c$, builds up the magnetic field in the coupling 10 and increases the amount of energy transmitted to the winch driving shaft 5. When a satisfactory rate of pull has been established, the controller can be left in the position to which it has been adjusted to attain that speed.

In this connection it should be noted that when the lever 34 is swung far enough to break the circuit at the contacts 44, the solenoid switch 39 is still held in its closed position because current flows from the main 31 through the switch bar 39 and the coil 45 to the other main 30.

An important advantage of this organization is that the flexible driving action inherent in the nature of the eddy current coupling 10 is an extremely valuable characteristic both in towing and also in pulling up the trawl, especially when high seas are running. As the boat rises on a wave, and the load on the driving mechanism increases, the coupling tends to maintain an approximately constant torque on the driven member b, and this tendency is an elastic or yielding one. What actually occurs is that the degree of slip of the member b relatively to its driving member a increases as the load increases, the speed of b slowing down. But it still continues to revolve and to take up on the cables, thus producing automatically the action that the operator attempts to create manually by slipping the clutches. The eddy current coupling, however, performs this function automatically in response to the increase in tension on the cables and its reaction, therefore, is substantially instantaneous and is softer and far more elastic than can be produced manually. In addition, it is accomplished without wear on the parts of the coupling. While some heat is created, it is not excessive and produces no smoke. As the boat settles back into the trough of the wave, and the strain on the cable eases, the speed of the driven element b of the coupling increases automatically and restores normal tension.

This produces as nearly perfect conditions for pulling the trawl as can be expected. It maintains an approximately uniform tension on the cables and greatly reduces the wear and tear on the winch, as well as on the driving mechanism itself.

When the trawl has been pulled up to the boat and is being fastened in place by the fisherman, the trawl can be eased away from the boat, if desired, merely by throwing the control lever 34 over to the right so that the contacts 36 and 40 are in engagement. This throws the clutch 25 into action and brings in the mechanism above described for revolving the shaft 13 in a reverse direction to normal. It thereupon backs up the winch shaft 3 and eases off the trawl until stopped by the movement of the controller 34 back into its middle position. This deenergizes the solenoid 18 and automatically sets the brake so that it holds the driven shaft 13 against rotation until again released.

While the pulling up operation is going on, the captain usually is directing or watching it from the bridge, where the switch 32 is within convenient reach. If anything goes wrong, he can instantly stop the entire operation of the winch by opening that switch. Or, if the conditions are such that the winch should be reversed as, for example, in order to release a man caught in the cables or ropes, that can be done instantly by the operator in the manner above described.

At the conclusion of the pulling up operation, the controller 34 is moved back into its middle or neutral position, the switch 32 is opened, and the motor 7 is stopped. The opening of the main control circuit deenergizes the relay 45, thus opening the switch 39. This element is useful in preventing the starting up of the winch driving apparatus unless the controller 34 is in its neutral position. That is, if it should be attempted to start up with the controller at either side of that position, the control system would not operate, even if the switch 32 were closed, until the controller had been returned to neutral, thus completing the circuit through the relay coil 45. This is a safety factor because, to start up suddenly with the drive on, might endanger the lives of the men handling nets, if they did not expect the winch to start, and it could also seriously damage the fish gear.

The invention thus provides a winch driving mechanism having not only the operating advantages of the complete electric drives, which have heretofore been regarded as superior to all others from an operating standpoint, but it avoids the complications of that system and provides a driving mechanism which is considerably less expensive, both in first cost and in maintenance, than is the electrical drive. In addition, it has the advantage of being instantly irreversible, which has not been true of any of the mechanical drives of which I am aware. This is of advantage not only for the reasons above mentioned, but also in other situations. For example, it is necessary in prior art constructions to pull off the cables by hand at the start of the fishing operation and until the trawl itself develops sufficient drag for this purpose. If the cables are coated with ice, this is an exceedingly disagreeable task. It can be avoided completely in applicant's driving mechanism by using the reverse gearing.

In cost of manufacture this mechanism is approximately comparable with that of the prior art mechanical constructions. But some of the difficulties that have been experienced with the latter are avoided by assembling all of the elements between the prime mover and the winch worm shaft on a single rigid frame or base, where those parts form a transmission unit in which they are held in accurate alignment to each other, notwithstanding the weaving of the ship during a storm. Moreover, this arrangement eliminates the necessity for using friction clutches on the winch; provides for the convenient coupling of the transmission unit to any suitable source of power in the ship; and because it is so compact, it takes up considerably less space in the engine room where space is exceedingly valuable. This is especially true in trawlers of the dragger type.

While I have herein shown and described a preferred embodiment of my invention, it will be evident that the invention may be embodied in other forms without departing from the spirit or scope thereof. Also, while I have disclosed the invention as applied to a worm driven winch, it is equally useful with winches driven by spur gearing or in any other manner.

Having thus described my invention, what I desire to claim as new is:

1. A driving mechanism for the towing winches of vessels, comprising a power shaft, a driven shaft, an electrically operated eddy current coupling connecting said shafts, a power take-off mechanism operatively connected with the driven shaft to receive power therefrom to drive said winch, a brake for said driven shaft, additional mechanical connections between said shafts for reversing the rotation of said driven shaft, the latter connections including a clutch, and a rigid frame on which said shafts, coupling, clutch and brake are assembled in definite cooperative relationship to each other to form a power transmitting unit.

2. A winch driving mechanism according to preceding claim 1, in which said brake is electrically operated and a single controller governs both said brake and said coupling.

3. A driving mechanism for the towing winches of trawlers and the like, comprising a power shaft, a driven shaft, an electrically operated eddy current coupling connecting said shafts, a power take-off mechanism operatively connected with the driven shaft to receive power therefrom to drive said winch in its wind-up direction, a brake for said driven shaft, additional mechanical connections between said shafts for reversing the rotation of said driven shaft, the latter connections including a clutch, said clutch and said brake being electrically operated; and a control circuit for said coupling, brake and clutch, including a controller governing the power supplied to the coupling and selectively operative to bring the clutch or the coupling into action, as desired, said brake being spring biased to hold it on when not energized, and said clutch being spring biased to hold it out when not energized, said circuit also including connections serving to keep the brake off when either the clutch or the coupling is in action but to apply the brake when both the clutch and the coupling are inactive.

4. A winch driving mechanism according to preceding claim 3, in which said control circuit includes a relay and operating connections therefor serving to hold the control circuit open in starting up until the controller is moved in to its neutral position.

5. A winch driving mechanism according to preceding claim 3, including an emergency switch which must be closed to render the control circuit operative, whereby the entire operation of the driving mechanism can be stopped and the brake set automatically by opening said switch.

6. A driving mechanism for the towing winches of vessels, comprising a power shaft, a driven shaft, an electrically operated eddy current coupling connecting said shafts, a power take-off mechanism operatively connected with the driven shaft to receive power therefrom to drive said winch, an electromagnetically operated brake for said driven shaft, additional mechanical connections between said shafts for reversing the rotation of said driven shaft, the latter connections including an electromagnetically operated clutch, and a control circuit for said coupling and said electromagnetically operated brake and clutch constructed and organized to hold the brake out of operation when either said coupling or said clutch is in action.

ISADORE BROMFIELD.

REFERENCES CITED

The following references are of record in the file of this patent:

UNITED STATES PATENTS

| Number | Name | Date |
|---|---|---|
| 748,488 | Eastwood | Dec. 29, 1903 |
| 761,459 | Eastwood | May 31, 1904 |
| 844,661 | Cutler | Feb. 19, 1907 |
| 934,104 | Steckel | Sept. 14, 1909 |
| 2,225,206 | Cassels | Dec. 17, 1940 |
| 2,267,114 | Lear | Dec. 23, 1941 |
| 2,333,863 | Hull | Nov. 9, 1943 |
| 2,401,003 | Lear | May 28, 1946 |